Sept. 22, 1925.

P. G. TACCHI 1,554,896

MEANS FOR UTILIZING INERTIA IN MOVING VEHICLES

Filed June 28, 1923

Inventor
Percy George Tacchi
by *[signature]*
Atty

Patented Sept. 22, 1925.

1,554,896

UNITED STATES PATENT OFFICE.

PERCY GEORGE TACCHI, OF ACTON, LONDON, ENGLAND.

MEANS FOR UTILIZING INERTIA IN MOVING VEHICLES.

Application filed June 28, 1923. Serial No. 648,309.

*To all whom it may concern:*

Be it known that I, PERCY GEORGE TACCHI, a subject of the King of Great Britain, of Acton, London, England, have invented certain new and useful Improvements in Means for Utilizing Inertia in Moving Vehicles, of which the following is a specification.

This invention comprises improvements in means for utilizing inertia in moving vehicles and is concerned with what have been termed vibration motors, such motors being adapted for utilizing the positive or negative accelerations, or the vibrations or oscillations of a vibrating or moving vehicle or structure. Such motors have heretofore comprised a resiliently supported weight having operative connection with ratchet and pawl or like mechanism, whereby the relative movement between the vehicle and the suspended weight or body effects an operation of the said mechanism, this operation being utilized in any desired manner, as for example, for the operation of movable advertisement devices.

According to the present invention, the weight or body is resiliently supported and operatively connected with the ratchet and pawl or like mechanism in such a manner that the relative movements of the weight or body in any direction in a plane effects an operation of the said mechanism. Thus, if the apparatus be mounted on a railway vehicle, for example, it is adapted for effecting operation of the mechanism by vibration or jolting of the vehicle and also by acceleration or retardation of that vehicle.

The mechanism may directly operate any movable device, such as an advertisement device, or it may be used for storing up energy, as by winding up a clockwork spring, to be used as desired for the operation of advertisement or other devices, as required.

Ratchet and pawl mechanism herein referred to may be either of the toothed variety or of the silent or friction pawl variety, as desired.

According to one very advantageous construction, a ring or annular weight is suspended or resiliently supported around a disc or wheel and pawl devices extend inwardly from the ring to the disc or wheel for effecting the step-by-step rotation of the latter. Or the ring or annular weight may be flexibly connected with an inner ring fitted with pawl devices for engaging with the disc or wheel. In some annular weight arrangements, the pawl devices take the form of spring blades, and in such cases it is possible to dispose the spring blades so that they assist in resiliently supporting the annular weight, as will be hereinafter fully described.

In order to enable the invention to be readily understood, reference is made to the accompanying drawing, in which several examples of construction are illustrated, and in which:—

Figure 1:
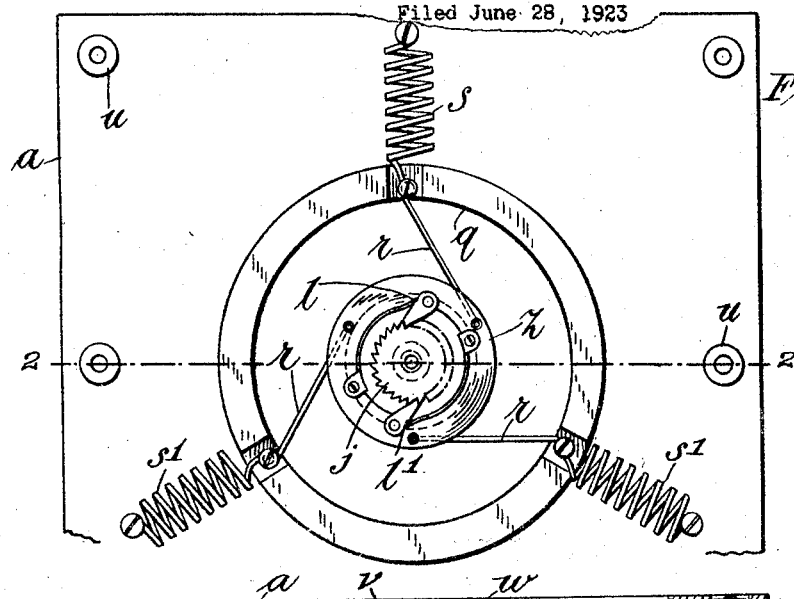
Figure 1 is a view illustrating the employment of an annular weight flexibly connected with an annular pawl-carrier in operative engagement with a ratchet.
Figure 2:
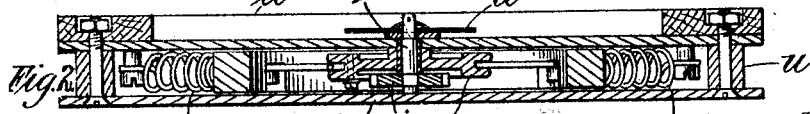
Figure 2 is a cross section on the line 2—2 of Figure 4.

Referring to Figures 1 and 2, $q$ designates a ring or annular weight suspended by a spring $s$ from the panel $a$ and supported at other points around its periphery by springs $s'$. The weight $q$ is connected by cords or flexible connections $r$ with a concentric ring $z$ carrying pawl devices $l\ l'$ for operatively engaging with the ratchet or disc $j$. As will be readily understood, relative movement of the weight $q$ in any direction in the plane of the panel, or out of the plane of the panel if the construction of the panel and casing permits, produces a pull in one or another of the cords $r$ and thereby effects a turning of the ring $z$ and a feed motion of the pawl devices $l\ l'$ on the ratchet $j$. As will be seen from Figure 2 the springs, weight and mechanism may be enclosed in a very thin or shallow casing of which the panel $a$ constitutes the front wall and the back wall $t$ is spaced, by spacers $u$, at such a short distance from the front wall that the weight $q$ has only room to move in the plane aforesaid and cannot wobble laterally and rattle. Figure 2 also shows how the spindle $v$ of the ratchet $j$ may extend through the front wall or panel and carry a movable device *w* forming part of, or working in conjunction with an advertisement device or picture on the front surface of the panel *a*.

Figure 3:
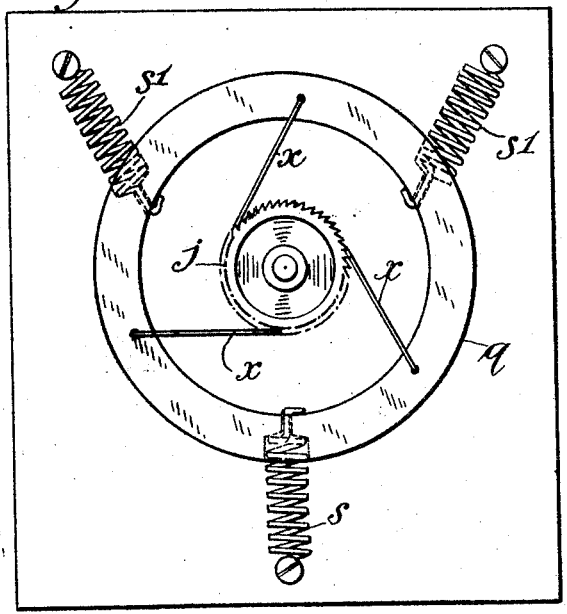
Figure 3 is a view illustrating an annular weight having direct operative engagement with a ratchet through the medium of spring blade pawls.

In the construction illustrated in Figure 3, the ring or annular weight *q* is fitted with three inwardly extending spring blades *x* having a pawl-like engagement with the ratchet *j*. It is apparent that movement of the weight *q* in any direction in the plane of the paper will result in one or another of the blades *x* effecting a feed of the ratchet *j*, the other blade meanwhile slipping past or receding from the said ratchet. In Figure 3, the weight *q* is shown as being suspended by two springs *s'* and sustained from beneath by one spring *s* but any arrangement of supporting or suspending springs may be employed.

Figure 4:
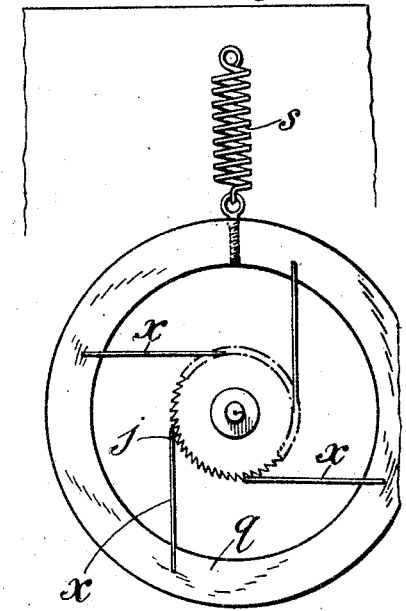
Figure 4 is a view of an arrangement somewhat similar to that seen in Figure 3, but with a different arrangement of suspension spring and a different disposition of spring blade pawls for a purpose hereinafter described.

In Figure 4, for example, the weight *q* is seen to be suspended by a single spring *s* and to be fitted with four inwardly extending spring blades *x* disposed 90° apart and bearing tangentially against the ratchet. Thus although the weight is suspended or supported by only one single spring, the movements of the weight in any direction in the plane of the paper are controlled owing to the resilient bearing of the blades *x* against the periphery of the ratchet *j*.

The constructions illustrated in Figures 1 to 4 are very advantageous for use in tube trains and other vehicles where the thickness of any panel advertisement is strictly limited so that there shall be no undue projection of the advertisement device into the interior of the vehicle. The annular weight construction enables an advertisement panel casing of minimum thickness to be provided to conform with the aforesaid restrictions. Also, the constructions illustrated in Figures 3 and 4 are very advantageous, not only from the point of view of minimum thickness but also from the point of view of utilizing the spring blades for assisting in supporting the weight, which enables some of the suspending or supporting springs *s s'* to be dispensed with.

I claim:

1. A weight motor comprising in combination, a ratchet member rotatable on a fixed axis, an annular weight, surrounding said ratchet, resilient supporting means for said annular weight, and pawl mechanisms including flexible members connected at different points around said weight, said mechanisms being operative to feed said ratchet upon movement of said weight taking place in relation to said ratchet.

2. A weight motor comprising in combination, a ratchet member rotatable on a fixed axis, an annular weight surrounding said ratchet, resilient supporting means for said weight, and a plurality of pawl mechanisms each including a flexible member said mechanisms being connected at a plurality of uniformly spaced points around said weight and being operative for feeding said ratchet upon movement of said weight in relation to said ratchet in any direction in the plane of the weight, substantially as set forth.

3. A weight motor comprising in combination, a ratchet member rotatable on a fixed axis, an annular weight surrounding said ratchet, a circular series of pawls operatively engaging said ratchet, and flexible pawl-operating means connected at uniformly spaced points around said weight, for the purpose set forth.

4. A weight motor comprising in combination, a ratchet member rotatable on a fixed axis, an annular weight surrounding said ratchet, a ring capable of oscillating about said axis, a circular series of pawls on said ring and operatively engaging said ratchet, and flexible pawl operating means connected at uniformly spaced points around said weight and to said ring, for the purpose set forth.

PERCY GEORGE TACCHI.